United States Patent [19]

Mueller et al.

[11] Patent Number: 4,668,911
[45] Date of Patent: May 26, 1987

[54] APPARATUS FOR MAKING NON-CONTACT ANGULAR DEFLECTION MEASUREMENTS

[75] Inventors: James W. Mueller; Scott A. Berning, both of Duncan, Okla.

[73] Assignee: Halliburton Company, Duncan, Okla.

[21] Appl. No.: 802,658

[22] Filed: Nov. 26, 1985

[51] Int. Cl.[4] .................... G01B 7/14; G01N 11/14
[52] U.S. Cl. .................................. 324/208; 73/59
[58] Field of Search ............ 324/207, 208, 167, 168, 324/174, 226, 261, 262; 73/432 A, 59, 60, 54; 340/870.35

[56] References Cited

U.S. PATENT DOCUMENTS

| 2,096,222 | 10/1937 | Bock | 73/59 |
|---|---|---|---|
| 2,266,733 | 12/1941 | Bays et al. | 73/59 |
| 2,603,087 | 7/1952 | Von Hortenau | 73/59 |
| 3,347,089 | 10/1967 | Perry | 73/59 |
| 3,402,729 | 9/1968 | Richmond et al. | 73/59 X |
| 3,751,975 | 8/1973 | Katsura | 73/59 |
| 3,977,248 | 8/1976 | Metzger | 73/432 A |
| 4,044,602 | 8/1977 | Higgs et al. | 73/59 |
| 4,157,036 | 6/1979 | Kivenson | 73/290 R |
| 4,175,425 | 11/1979 | Brookfield | 73/59 |
| 4,299,118 | 11/1981 | Gau et al. | 73/59 |
| 4,466,276 | 8/1984 | Ruyak et al. | 73/59 |
| 4,484,468 | 11/1984 | Gau et al. | 73/60 |

FOREIGN PATENT DOCUMENTS

| 1184119 | 12/1964 | Fed. Rep. of Germany | 73/59 |
|---|---|---|---|
| 2920084 | 11/1980 | Fed. Rep. of Germany | 324/208 |
| 415553 | 7/1974 | U.S.S.R. | 73/59 |
| 0568869 | 8/1977 | U.S.S.R. | 73/60 |
| 0594438 | 2/1978 | U.S.S.R. | 73/54 |
| 0650009 | 4/1979 | U.S.S.R. | 324/174 |
| 0670855 | 6/1979 | U.S.S.R. | 73/60 |

OTHER PUBLICATIONS

SPE 9285—Transition Time of Cement Slurries Between the Fluid and Set State.

Primary Examiner—Stewart J. Levy
Assistant Examiner—Robert R. Raevis
Attorney, Agent, or Firm—James R. Duzan; E. Harrison Gilbert, III

[57] ABSTRACT

An angular displacement indicating apparatus includes internal and external magnets disposed so that the external magnet tracks the internal magnet when a shaft to which the internal magnet is connected rotates. The external magnet is connected to a rotary variable differential transformer, for example, so that the external magnet moves from a null position in response to rotation of the internal shaft thereby causing the transformer to generate an electrical signal proportional to the angle of rotation of the shaft. Embodiments of the invention include external connecting mechanisms which can be moved to physically indicate the actual angle of deflection of the internal shaft.

13 Claims, 5 Drawing Figures

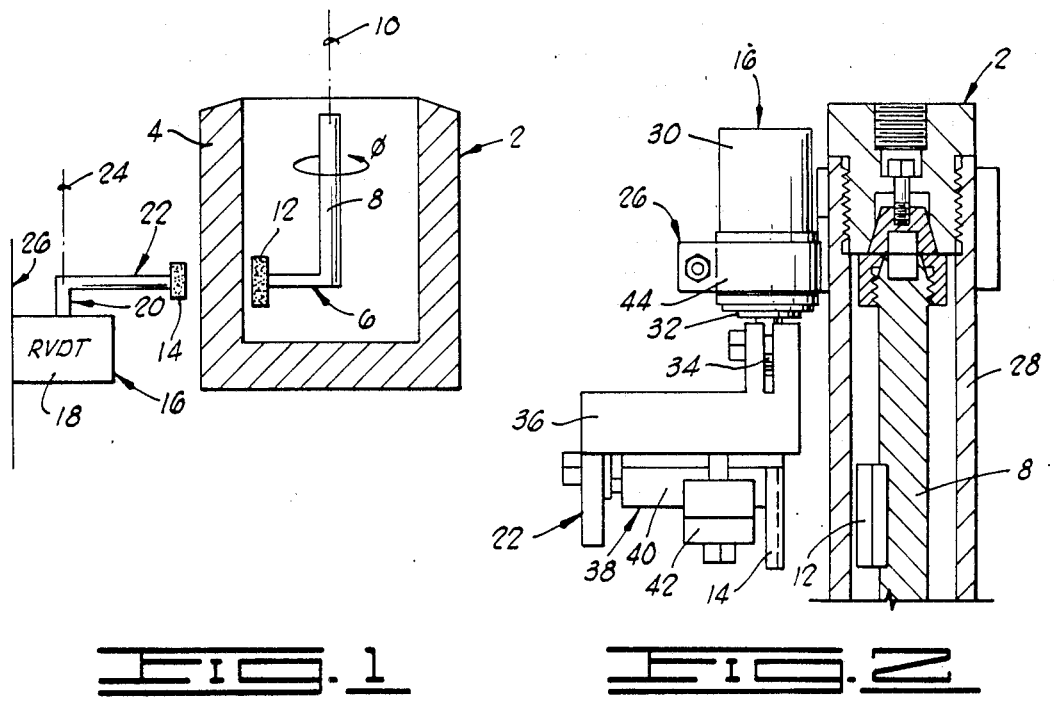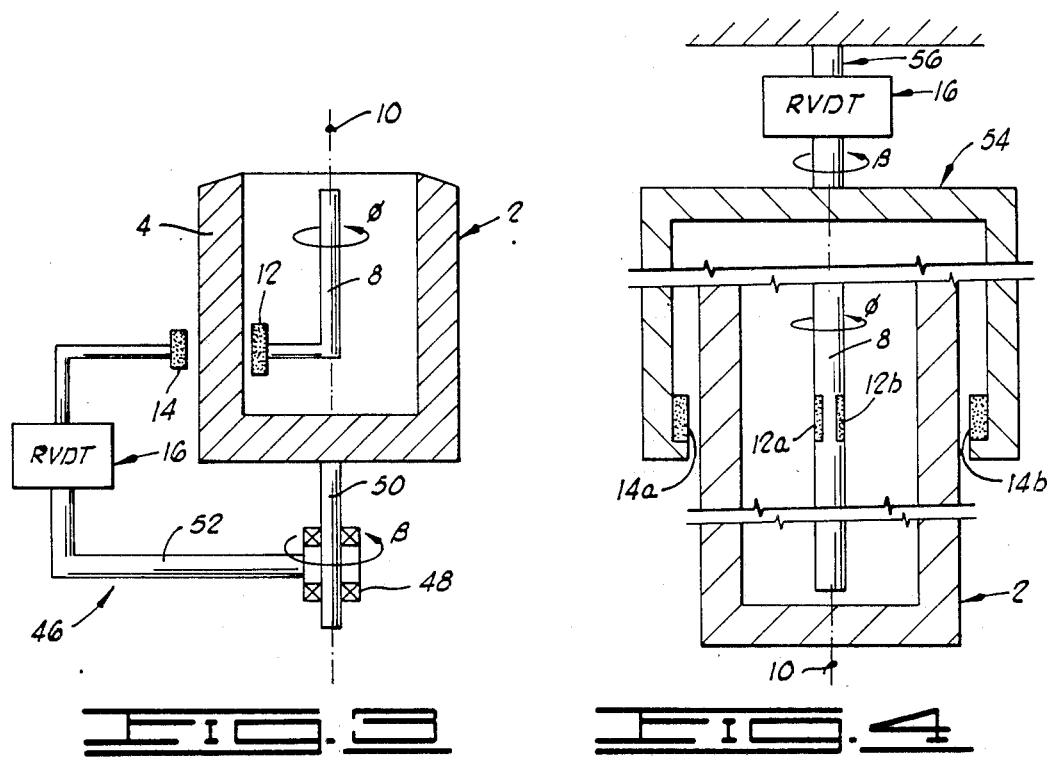

APPARATUS FOR MAKING NON-CONTACT ANGULAR DEFLECTION MEASUREMENTS

BACKGROUND OF THE INVENTION

This invention relates generally to apparatus for making a non-contact angular deflection measurement and more particularly, but not by way of limitation, to apparatus for magnetically detecting across a magnetically permeable wall the rotational movement of a member about an axis.

A consistometer or a viscometer is a known type of device in which the angular displacement, or rotation, of an internal shaft within a pressurizable vessel is used to determine properties of a fluid contained in the vessel. To measure such angular displacement, various types of sensing apparatus have been used. These apparatus include spring-biased sensing elements, indicia-containing dials visible through sight glasses, and electrical signals generated by means of strain gauges or linearly variable differential transformers. Magnetic and electromagnetic devices can also be used. A particular example of a magnetic sensing device is disclosed in U.S. Pat. No. 4,466,276 to Ruyak et al. In the Ruyak et al. device torque is transferred through a magnetic coupling to a potentiometer.

In many of the aforementioned examples, the sensing devices, or at least some operational parts thereof, are placed in an environment of the consistometer or viscometer wherein adverse conditions for such parts are found. These conditions result from the high temperatures and pressures that can exist in the vessel or from properties of the fluid contained in the vessel. In such an environment, the accurate measurement of the angular deflection is made difficult because the operational parts have to be compatible with the adverse conditions in the vessel. Sensing devices which have such compatible components can be relatively expensive because of the special construction needed to withstand the adverse conditions. They can also be expensive to maintain and replace because it can be difficult to remove internal components from inside the vessel. Additionally, some of these devices can produce friction in bearing surfaces which affects the small torsional forces that cause the angular deflections of the shaft, and therefore generate inaccurate readings.

In view of the aforementioned shortcomings, there is the need for an improved apparatus having sensing or detection components that are located outside an adverse environment in which is located the element whose angular deflection or rotation is to be monitored. This would obviate the need to construct such components so that they can withstand the adverse conditions. Such components also would be more easily maintained. Such features would provide a more cost effective measurement apparatus. There is also the need for such a measurement apparatus to be constructed so that it is not adversely affected by friction in bearing surfaces. Such an improved apparatus should also be capable of directly indicating the actual angle of rotation and the actual location of the displacement of the monitored elements. There is still the further need for such an apparatus to have a construction which can be readily retrofitted to existing devices, such as viscometers and consistometers, whose angular displacements are to be monitored. This retrofitting feature would be particularly useful, for example, with a sight-glass indicator type of viscometer or consistometer whereby the need to make manual inspections and logs would be obviated.

SUMMARY OF THE INVENTION

The present invention overcomes the above-noted and other shortcomings of the prior art by providing a novel and improved apparatus for making a non-contact angular deflection measurement. The present invention has its sensing components disposed externally of any adverse environment in which the monitored element might be located, and it is not adversely affected by friction in bearing surfaces. At least some embodiments of the present invention have a structure which physically indicates the actual angle and location of the displacement of the internal elements. The present invention can also be retrofitted to existing devices, such as consistometers and viscometers.

Broadly, the apparatus includes a magnet connected to the angularly movable or rotatable member which is to be monitored; tracking means, disposed across a wall or otherwise spaced from the movable member, for magnetically following the position of the magnet whenn the movable member is angularly deflected; and detector means for generating an electrical signal in correspondence with the relative position of the tracking means to the detector means. In the preferred embodiments the detector means includes a rotary variable differential transformer connected to the tracking means, but the detector means is by no means limited to such a specific device.

In one embodiment, the transformer includes a stationary portion disposed in a fixed position, and a rotary portion rotatably associated with the stationary portion; and the tracking means includes a tracking magnet and connector means for connecting the tracking magnet to the rotary portion of the transformer.

In another embodiment, the transformer includes first and second portions movably related to each other; the tracking means includes a tracking magnet and first connector means for connecting the tracking magnet to the first portion of the transformer so that the first portion moves from a null position relative to the second portion when the tracking magnet moves in response to angular deflection of the movable member; and the detector means further includes second connector means for connecting the second portion of the transformer relative to the movable member so that the second portion is movable relative to the movable member and to the tracking magnet to return the first portion to the null position relative to the second portion.

In still another embodiment the transformer includes the two portions; the detector means further includes means for pivotally mounting the two portions in coaxial relationship with the movable member; and the tracking means includes a support member, which is connected to one of the transformer portions and disposed concentrically with the movable member, and a tracking magnet, which is connected to the support member.

Therefore, from the foregoing, it is a general object of the present invention to provide a novel and improved apparatus for making a non-contact angular deflection measurement. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a schematic illustration of a first preferred embodiment of the present invention.

FIG. 2 is an elevational view exemplifying a specific implementation of the first preferred embodiment.

FIG. 3 is a schematic illustration of a second preferred embodiment of the present invention.

FIG. 4 is a schematic illustration of a third preferred embodiment of the present invention.

FIG. 5 is a sectional elevational view, showing a lower portion displaced 90° relative to an upper portion, exemplifying a specific implementation of the third preferred embodiment.

DETAILED DESCRIPTION OF THE PREFERRED EMBODIMENTS

Figure 9:
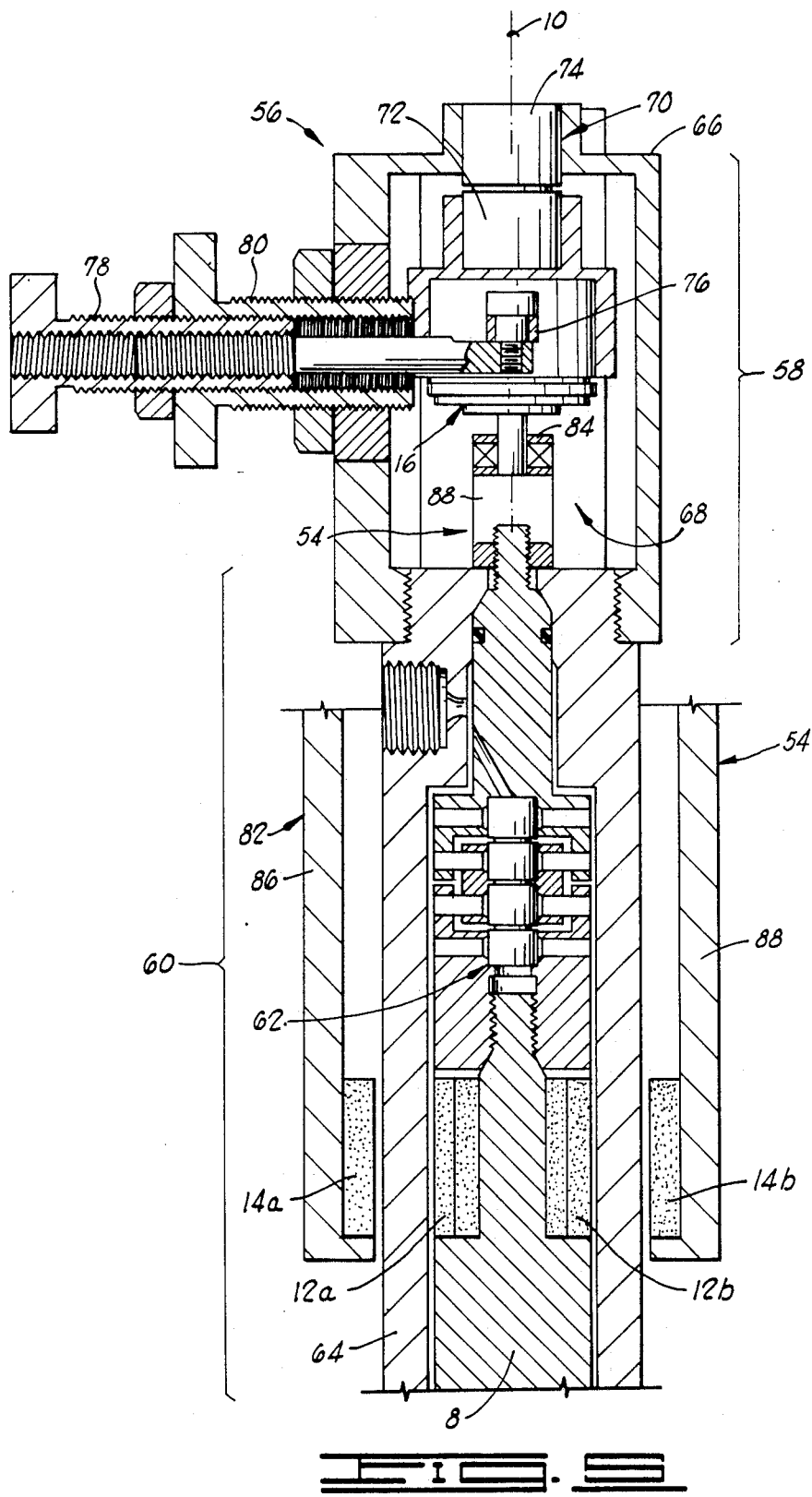

The preferred embodiments of the present invention will be described with reference to a consistometer or viscometer having a vessel 2 which includes a wall 4 made of a suitable magnetically permeable material, such as stainless steel, for example. A fluid to be tested is placed in the vessel 2. In response to rotation of fluid inside the vessel 2, the fluid acts upon a movable member 6, which in the exemplary environment is a suitable rotatable paddle of a type known to the art. Such a member or paddle 6 is schematically illustrated simply as a shaft 8 in the drawings. The shaft 8 is spatially fixed when the consistometer or viscometer is fully assembled, but the shaft 8 is rotatable about an axis of rotation 10 in response to the force exerted on the member 6 by the rotation of the fluid contained in the vessel 2 during a test conducted in the consistometer or viscometer in a manner as known to the art.

The present invention described with reference to such a consistometer or viscometer includes an internal non-mechanical, non-electrical drive component for driving an external monitoring means which is located outside of the internal environment of the vessel 2, which internal environment could be adverse to the proper operation of the type of monitoring means contemplated to be used in the present invention. Such an adverse environment could be due in the exemplary consistometer or viscometer to the pressure and temperature maintained in the vessel and the various properties of the fluid contained in the vessel.

The internal drive means includes one or more magnets. The external monitoring means includes tracking means, disposed across the wall from the movable member 6, for following the position of the internal magnet or magnets when the movable member 6 is angularly deflected. The monitoring means also includes detector means for detecting when the tracking means moves in response to movement of the internal magnet or magnets. These external means have connector means for connecting the various external components. These internal and external elements are more particularly described hereinbelow with reference to the three preferred embodiments illustrated in the drawings.

FIG. 1 shows the vessel 2 having the magnetically permeable wall 4 and having the shaft 8 rotatably disposed therein. Rigidly attached to the shaft 8 is the internal magnet which is identified by the reference numeral 12 in FIG. 1. The magnet 12 is connected to the shaft 8 with the polarity of the magnet suitably oriented so that its magnetic flux properly penetrates the wall 4.

The tracking means of the embodiment shown in FIG. 1 includes another magnet, identified by the reference numeral 14, which is oriented so that its polarity is complemental to the polarity of the magnet 12 whereby the magnet 14 responds to movement of the shaft 8 by following the magnet 12 as it moves with the shaft 8. In this embodiment the magnet 14 is radially spaced from the magnet 12 on the other side of the wall 4.

The magnet 14 is connected to the detector means which in this preferred embodiment includes a rotary variable differential transformer (RVDT) 16 having a stationary portion 18 and rotary portion 20. The RVDT 16 generates an electrical signal in response to relative movement between the stationary portion 18 and the rotary portion 20. Although a rotary variable differential transformer is shown in the FIG. 1 embodiment, it is contemplated that the present invention can be implemented with any suitable sensing means for sensing an angular deflection.

A connector means 22, which forms part of the tracking means, rigidly connects the magnet 14 to the rotary portion 20 so that the magnet 14 pivots relative to the stationary portion 18 in response to rotation of the shaft 8 and its connected magnet 12. The axis of pivotation about which the magnet 14 pivots is illustrated in FIG. 1 and identified by the reference numeral 24. This axis of pivotation 24 is spaced from the axis of rotation 10 of the shaft 8 and is disposed parallel thereto. The axes 10, 24 are positioned so that the magnets 12, 14 are between these axes.

Another connector means, generally identified by the reference numeral 26 and forming part of the detector means, connects the stationary portion 18 of the transformer 16 to a location which is fixed relative to the wall 4 of the vessel 2 and to the fixed spatial location of the shaft 8. Therefore, in this embodiment only the magnets 12, 14 are spatially displaced in response to rotation of the shaft 8.

In using this embodiment, the RVDT 16 is suitably positioned and controlled so that when the magnets 12, 14 are in an initial or starting position, the electrical output from the transformer 16 is at a null or zero voltage. As the shaft 8 is deflected or rotated through an angle $\phi$ in response to rotation of the vessel 2 and the resultant force exerted on the movable member 6 by the fluid in the vessel 2, the magnet 14 moves thereby causing the rotary portion 20 of the RVDT 16 to rotate. The pivotation or deflection of this portion of the transformer 16 causes a change in the output voltage from the transformer 16, which voltage is proportional to the amount of deflection of the shaft 8. In this operation, the movement of the magnet 14 in response to rotation of the shaft 8 causes the magnet 14 to subtend a horizontal acute angle which opens toward the shaft 8. That is, as viewed in the orientation of FIG. 1, the magnet 14 moves arcuately in front of or behind the plane in which FIG. 1 is drawn so that the convexity of arc is toward the vessel 2 (i.e., the magnet 14 tends to move away from the vessel 2).

A specific implementation of the embodiment shown in FIG. 1 is illustrated in FIG. 2. The elements of FIG. 2 corresponding to those of FIG. 1 are indicated by the same reference numerals. More particularly, FIG. 2 discloses the shaft 8 disposed longitudinally or axially within a cylindrical sleeve or body 28 forming part of a specific type of the vessel 2. The stationary portion 18 of the transformer 16 includes a stator 30 in which a rotor 32, having a drive shaft 34, is disposed for implementing the rotary portion 20. The specific implementation of the connector means 22 shown in FIG. 2 includes a crank arm 36 having one end connected to the drive shaft 34 and having another end connected to an adjustment means 38. The adjustment means 38 includes a slide element 40 having the magnet 14 connected to it. The slide element 40 is supported by a slide support member 42. The adjustment means 38 allows the magnet 14 to be adjustably connected to the crank arm 36 so that the magnet 14 can be positioned at a selectable radial distance from the magnet 12. This allows an adjustment of the effective strength of the magnetic force acting between the magnets 12, 14.

The specific implementation of the connector means 26 illustrated in FIG. 2 includes a suitable clamp or bracket 44 attached to the cylindrical sleeve 28 and the stator 30.

With reference to FIG. 3, another preferred embodiment of the present invention will be described. This additional embodiment has substantially the same construction as the FIG. 1 embodiment, as indicated by like reference numerals; however, the embodiment of FIG. 3 has a different type of means for connecting the RVDT 16 relative to the vessel 2 and the shaft 8. This different connector means distinguishing the FIG. 3 embodiment from the FIG. 1 embodiment is generally identified by the reference numeral 46. This connector means 46 connects the portion 18 of the RVDT 16 relative to the shaft 8 so that the portion 18 is movable (particularly, revolvable) relative to the shaft 8. This also connects the portion 18 so that it is movable relative to the magnet 14 once the magnet 14 has moved from its null position in response to rotation of the shaft 8, whereby such movement returns the portion 20 to the null position relative to the portion 18. More particularly, this rotational type of connector means 46 connects the RVDT 16 relative to the shaft 8 so that the RVDT 16 is pivotable about an axis which is coaxial with the axis of rotation 10. In the embodiment schematically illustrated in FIG. 3, such a connector means includes a coupling sleeve 48 journaled about a shaft 50 which is disposed coaxially with the shaft 8. A rigid connecting arm 52 connects the RVDT 16 to the coupling sleeve 48. A suitable drive mechanism (not shown) is connected to the connecting means 46 so that upon activation of the drive mechanism the RVDT 16 is pivoted or revolved relative to the coaxial shafts 8, 50.

In operation, this FIG. 3 embodiment initially operates the same as the embodiment shown in FIG. 1 in that upon rotation of the shaft 8, the magnet 14 tracks the magnet 12, thereby pivoting the rotor of the RVDT 16 relative to its stator and thus generating an electrical signal proportional to the angle of rotation of the shaft 8. Once this electrical signal has been generated, however, the embodiment shown in FIG. 3 is further utilized by rotating the RVDT 16 relative to the shaft 50, which thus rotates the stator of the RVDT 16 relative to its rotor because of the fixed positioning maintained between the attracted magnets 12, 14, which movement is continued until the original zero or null voltage is again output from the RVDT 16. The significance of this further operation of the embodiment shown in FIG. 3 is that the angle $\beta$ that the connecting arm 52 is rotated to return to RVDT 16 to a position in which the null voltage is provided is equal to the angle of deflection, $\phi$, of the shaft 8. Therefore, with the embodiment shown in FIG. 3 an external physical indication of the exact angle of deflection and of the exact positioning or location of the arc subtended by the internal magnet 12 can be produced. This is distinguishable from the embodiment shown in FIG. 1 in that the horizontal acute angle subtended by the movement of the magnet 14 is not necessarily equal to the angle of deflection of the shaft 8.

Still another embodiment of the present invention is schematically illustrated in FIG. 4. This embodiment is similar to the embodiments of FIGS. 1 and 3 in that this third described embodiment includes elements similar to those of the embodiment of FIG. 1, as indicated by like reference numerals, and in that this third described embodiment produces an indication of the exact magnitude and location of the angle of rotation of the internal magnet, as can be produced with the FIG. 3 embodiment. The principal difference between the FIG. 3 and FIG. 4 embodiments is that the RVDT 16 is positioned in the FIG. 4 embodiment so that its rotor is coaxial with the shaft 8. This obviates the necessity of revolving the entire RVDT 16 relative to the shaft 8 to indicate the actual angle of deflection. This difference creates the distinction that in the FIG. 4 embodiment it is the connector means of the tracking means that is used to indicate the actual angle of deflection of the shaft 8, rather than the connector means of the detector means.

FIG. 4 shows that the connector means of the tracking means of this embodiment includes a brace 54 concentrically related to the vessel 2 and, particularly, to the shaft 8. This brace 54 has two magnets 14a, 14b connected to it to respond to the two magnets 12a, 12b shown connected to the shaft 8. Although the concentric construction implementing the two internal and the two external magnets is shown in FIG. 4, only one pair of internal and external magnets need be used as shown in the first two described embodiments or more than two pairs of internal and external magnets can be used (such use of two or more pairs of magnets can also be implemented in the FIG. 3 embodiment). The critical feature of this third described embodiment, however, is that the rotor of the RVDT 16, to which the brace 54 is connected, is maintained in coaxial relationship with the shaft 8. This is achieved by a suitable connector means 56 for connecting the RVDT 16 in fixed spatial relationship with the vessel 2 and specifically in coaxial relationship with the shaft 8.

The operation of the FIG. 4 embodiment is similar to the FIG. 1 embodiment in that as the shaft 8 rotates, the magnets 14a, 14b track the magnets 12a, 12b so that the brace 54 moves the rotor of the RVDT 16 from its null position to generate a voltage which is proportional to the deflection of the shaft 8. In the FIG. 4 embodiment, however, the displacement of the brace 54 represents a true indication of the actual magnitude and location of the equal angles of deflection through which the magnets 12a, 12b have moved.

With reference to FIG. 5, a specific implementation of the FIG. 4 embodiment with be described. FIG. 5 is laid out to show an upper portion 58 and a lower portion 60. The lower portion 60 is drawn in a position rotated 90° from its actual position for purposes of describing the specific implementation with reference to a single drawing. The lower portion 60 is shown as including the shaft 8 and having the magnets 12a, 12b mounted thereon in spaced relationship around the circumference of the shaft. This spatial relationship is specifically at diametrically opposite locations on the shaft 8. The shaft 8 pivots about a pivot location defined by flexible pivot members 62 of types as known to the art. The shaft 8 is disposed longitudinally through a cylindrical sleeve or neck portion 64 forming part of the vessel 2 of the specific implementation depicted in FIG. 5. The axis of rotation 10 passing through the pivot location defined by the flexible pivot element 62 is also illustrated in FIG. 5.

Disposed coaxially along this axis of rotation 10 is the RVDT 16 which is also used in the specific implementation illustrated in FIG. 5. The RVDT 16 is connected in fixed spatial relationship to the neck portion 64 by means of the aforementioned connector means 56. In the specific implementation the connector means 56 includes support means for retaining the RVDT 16 spatially fixed relative to the vessel 2, and thus to the rotatable member 4, and it also includes adjustment means for adjustably rotating the RVDT 16 relative to the support means against an opposing resilient biasing force.

In the specific implementation the support means includes a support member or housing 66 connected to the portion 64 and extending axially therefrom. The housing 66 has a lateral opening 68 defined therethrough. The support means also includes resilient, pivotal coupling means for pivotally coupling the RVDT 16 to the support member or housing 66. This coupling means includes a flexible pivot member 70 of a type as known to the art, which member provides an opposing resilient biasing force when a lower portion 72 of the member 70 is rotated relative to an upper portion 74 of the member 70.

The adjustment means includes a lever arm 76 extending from the stator of the RVDT 16 (towards the viewer for the orientation illustrated in FIG. 5). The adjustment means further includes an extendable adjustment member 78 engaging the lever arm 76, and an adjustment member carrier element 80 connected to the support member 66 as shown in FIG. 5. The lever arm 76 extends from the RVDT 16 perpendicular to the direction the housing 66 extends from the cylindrical sleeve member 64. The extendable adjustment member 78 includes a threaded screw, and the adjustment member carrier element includes a screw carrier member connected to the housing 66 in perpendicular relation to the lever arm 76.

The specific implementation shown in FIG. 5 also includes an external tracking means functionally similar to those previously mentioned but including the brace 54 having the magnets 14a, 14b connected thereto. In the specific implementation the brace 54 includes a substantially U-shaped bracket 82 having a cross member 84 connected to the rotor of the RVDT 16 and having two longitudinal arms 86, 88 extending perpendicularly from the cross member 84 in parallel relationship to the shaft 8. The bracket 82 is disposed so that the cross member extends through the opening 68 defined in the housing 66 and so that the two arm members 86, 88 extend downwardly from the cross member 84 outside of the housing 66 and the neck portion 64 to which the housing 66 is connected.

In general, the operation of the specific implementation shown in FIG. 5 is apparent from the drawings and from the previous explanation of the general embodiment shown in FIG. 4, except possibly to the extent of the adjustment means including the elements 76, 78, 80. These elements are used to adjust the rotational position of the stator of the RVDT 16 relative to the rotor to achieve a null position when the shaft 8 is in an undeflected or unrotated position. This is done by appropriately threading the member 78 into or out of the carrier member 80 to pivot the stator of the RVDT 16 through the flexible pivot member 70. When such adjustment is made, the lever arm 76 is held adjacent the end of the member 78 by means of the opposing biasing force exerted by the flexible pivot member 70.

Upon rotation of the shaft 8, the bracket 82 correspondingly pivots by means of the responsive interaction of the magnets 12a, 12b and 14a, 14b to move the rotor of the RVDT 16 from its null position, thereby generating an electrical signal proportional to the angle of deflection of the shaft 8. The physical position of the bracket 82 indicates the actual angle of rotation of the shaft 8.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for making a non-contact angular deflection measurement through a wall, spaced from one side of which wall is a movable member whose angular deflection is to be measured, said apparatus comprising:
    a magnet connected to the movable member;
    tracking means, disposed across the wall from the movable member, for magnetically following the position of said magnet when the movable member is angularly deflected;
    detector means for generating an electrical signal in correspondence with the relative position of said tracking means to said detector means, said detector means including a rotary variable differential transformer connected to said tracking means, said transformer including a stationary portion, disposed at a location which is fixed relative to the wall and parallel to the movable member, and a rotary portion rotationally associated with said stationary portion for rotation about an axis parallel to the movable member; and
    wherein said tracking means includes:
        a tracking magnet; and
        connector means for connecting said tracking magnet to said rotary portion of said transformer.

2. An apparatus for making a non-contact angular deflection measurement through a wall, spaced from one side of which wall is a movable member whose angular deflection is to be measured, said apparatus comprising:
    a magnet connected to the movable member;
    tracking means, disposed across the wall from the movable member, for magnetically following the position of said magnet when the movable member is angularly deflected;
    detector means for generating an electrical signal in correspondence with the relative position of said tracking means to said detector means, said detector means including a rotary variable differential transformer connected to said tracking means; and
    wherein:
        said transformer includes first and second portions movably related to each other;
        said tracking means includes:
            a tracking magnet; and first connector means for connecting said tracking magnet to said first portion of said transformer so that said first portion moves from a null position relative to said second portion when said tracking magnet moves in response to angular deflection of the movable member; and said detector means further includes second connector means for connecting said second portion of said transformer relative to the movable member so that said second portion is movable relative to the movable member and to said tracking magnet to return said first portion to the null position relative to said second portion.

3. An apparatus for making a non-contact angular deflection measurement through a wall, spaced from one side of which wall is a movable member whose angular deflection is to be measured, said apparatus comprising:

a magnet connected to the movable member;

tracking means, disposed across the wall from the movable member, for magnetically following the position of said magnet when the movable member is angularly deflected;

detector means for generating an electrical signal in correspondence with the relative position of said tracking means to said detector means, said detector means including a rotary variable differential transformer connected to said tracking means; and wherein:

said transformer includes:
a first transformer portion; and
a second transformer portion having said first transformer portion rotatably associated therewith;

said detector means further includes means for pivotally mounting said first and second transformer portions in coaxial relationship with the movable member; and said tracking means includes:
a support member connected to said first transformer portion and disposed concentrically with the movable member; and
a tracking magnet connected to said support member.

4. An apparatus for magnetically detecting rotational movement of a member about an axis of rotation, which member is rotatively disposed within a body, comprising:

a first magnet connected to the member;

a second magnet, responsive to said first magnet, spaced from said first magnet;

detector means for detecting when said second magnet moves in response to movement of said first magnet, said detector means including a stator, attached to the body, and a rotor, rotatively disposed within said stator; and connector means for pivotally connecting said second magnet to said detector means about an axis of pivotation spaced from the axis of rotation of the member, said connector means including:
a crank arm connected to said rotor; and
adjustment means for adjustably connecting said second magnet to said crank arm so that said second magnet can be positioned a selectable radial distance from said first magnet.

5. An apparatus for magnetically detecting rotational movement of a member about an axis of rotation, comprising:

a first magnet connected to the member;

a second magnet, responsive to said first magnet, spaced from said first magnet;

detector means for detecting when said second magnet moves in response to movement of said first magnet;

connector means for pivotally connecting said second magnet to said detector means about an axis of pivotation spaced from the axis of rotation of the member; and coaxial connector means for connecting said detector means relative to the member so that said detector means is revolvable about the member.

6. An apparatus for magnetically detecting rotational movement of a member about an axis of rotation, comprising:

a first magnet connected to the member;

a second magnet, responsive to said first magnet, spaced from said first magnet;

detector means for detecting when said second magnet moves in response to movement of said first magnet;

connector means for pivotally connecting said second magnet to said detector means about an axis of pivotation spaced from the axis of rotation of the member; and wherein:
said detector means has a null position for indicating no rotational movement of the member;

said connector means connects said second magnet to said detector means at said null position when the member has not rotationally moved, but from which null position said second magnet moves when the member rotationally moves; and said detector means includes further connector means for connecting said detector means relative to the member so that once the member has rotationally moved, said detector means is movable through an angle relative to the member until said second magnet returns to said null position, whereby said angle equals the angle of rotational movement of the member.

7. An apparatus for magnetically detecting rotational movement of a rotatable member about an axis of rotation, comprising:

a magnet mounted on the rotatable member;

angular displacement sensing means for generating an electrical signal as a function of rotational movement of the rotatable member;

support means for retaining said sensing means relative to the rotatable member, said support means including a support member and resilient coupling means for coupling said sensing means to said support member;

external tracking means, attached to said sensing means and disposed externally of the immediate environment of the rotatable member and said magnet connected thereto but responsive to said magnet, for moving at least a portion of said sensing means through an angle equal to the angle of rotational movement of the rotatable member; and adjustment means for adjustably rotating said sensing means relative to said support member against an opposing resilient biasing force exerted by said resilient coupling means.

8. An apparatus as defined in claim 7, wherein said adjustment means includes:
a lever arm extending from said sensing means;
an extendable adjustment member engaging said lever arm; and
an adjustment member carrier element connected to said support member.

9. An apparatus as defined in claim 8, wherein:
said sensing means includes a stator, connected to said coupling means, and a rotor, rotatably disposed relative to said stator; and
said external tracking means includes:
a bracket having a cross member connected to said rotor and having a longitudinal arm extending from said cross member in parallel relationship to the rotatable member; and
a tracking magnet connected to said longitudinal arm.

10. An apparatus as defined in claim 9, wherein said rotor is disposed in coaxial relationship with the rotatable member.

11. An apparatus for magnetically detecting rotational movement of a rotatable member about an axis of rotation, comprising:
a magnet mounted on the rotatable member;
angular displacement sensing means for generating an electrical signal as a function of rotational movement of the rotatable member;
support means for retaining said sensing means relative to the rotatable member;
external tracking means, attached to said sensing means and disposed externally of the immediate environment of the rotatable member and said magnet connected thereto but responsive to said magnet, for moving at least a portion of said sensing means through an angle equal to the angle of rotational movement of the rotatable member; and
wherein:
said sensing means includes a stator, connected to said support means, and a rotor, rotatably disposed relative to said stator; and
said external tracking means includes:
a bracket having a cross member connected to said rotor and having a longitudinal arm extending from said cross member in parallel relationship to the rotatable member; and
a tracking magnet connected to said longitudinal arm.

12. An apparatus as defined in claim 11, wherein said rotor is disposed in coaxial relationship with the rotatable member.

13. An apparatus for magnetically detecting rotational movement of a rotatable member about an axis of rotation, the rotatable member rotatably received in a cylindrical sleeve, said apparatus comprising:
a first magnet mounted on the rotatable member;
a second magnet mounted on the rotatable member in spaced relation to said first magnet;
angular displacement sensing means for generating an electrical signal as a function of rotational movement of the rotatable member;
support means for retaining said sensing means relative to the rotatable member, said support means including:
a housing connected to the cylindrical sleeve and extending axially therefrom, said housing having a lateral opening defined therethrough; and
pivotal coupling means for pivotally coupling said sensing means to said housing;
external tracking means, attached to said sensing means and disposed externally of the immediate environment of the rotatable member and said magnet connected thereto but responsive to said magnet, for moving at least a portion of said sensing means through an angle equal to the angle of rotational movement of the rotatable member, said external tracking means including:
a substantially U-shaped bracket having a cross member extending through said opening in said housing and connected to said sensing means and having two arm members extending from said cross member near the cylindrical sleeve;
a third magnet connected to one of said arm members; and
a fourth magnet connected to the other of said arm members; and
adjustment means for adjustably setting the rotational orientation of said sensing means to said housing, said adjustment means including:
a lever arm extending from said sensing means perpendicular to the direction said housing extends from the cylindrical sleeve;
a screw carrier member connected to said housing in perpendicular relation to said lever arm; and
a screw movably disposed through said screw carrier member in engagement with said lever arm.

* * * * *